Figure 1:
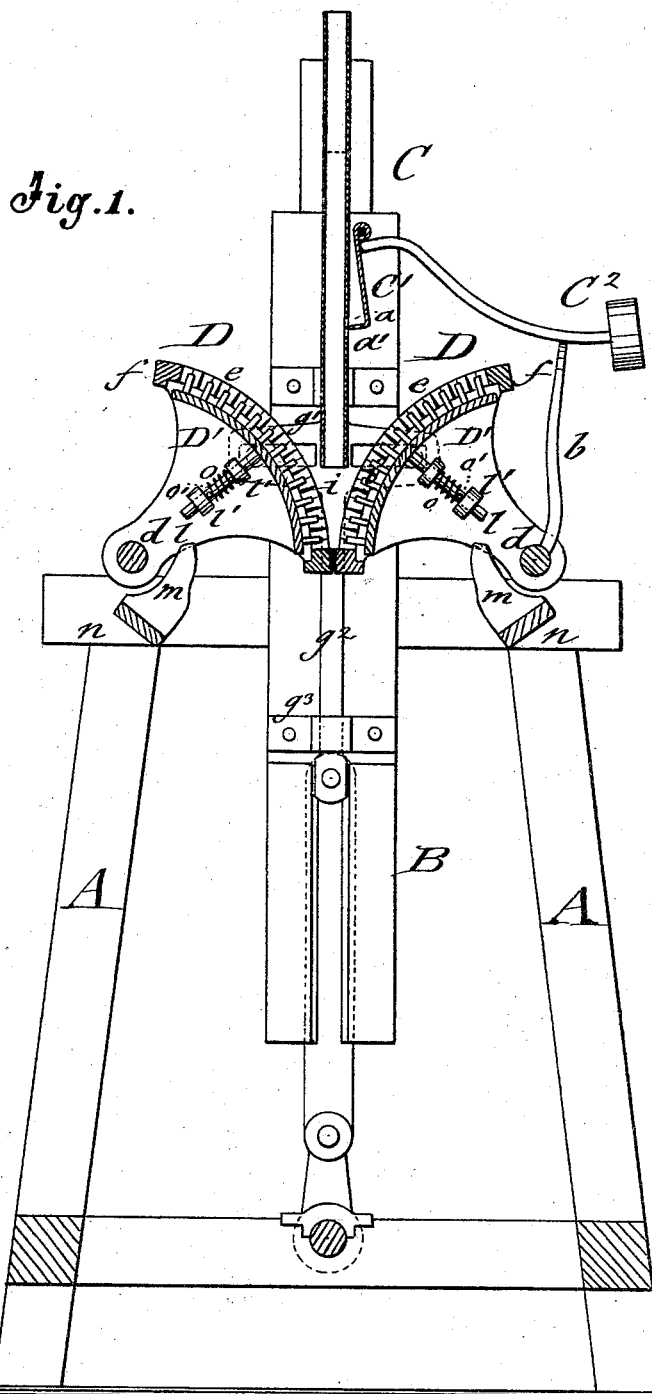

2 Sheets--Sheet 1.

H. SCHNITZSPAN.
Machines for Cutting Cube Sugar.

No. 148,145. Patented March 3, 1874.

WITNESSES:
A Bennerkendorf.
Alex F. Roberts

INVENTOR:
H. Schnitzspan
BY
ATTORNEYS.

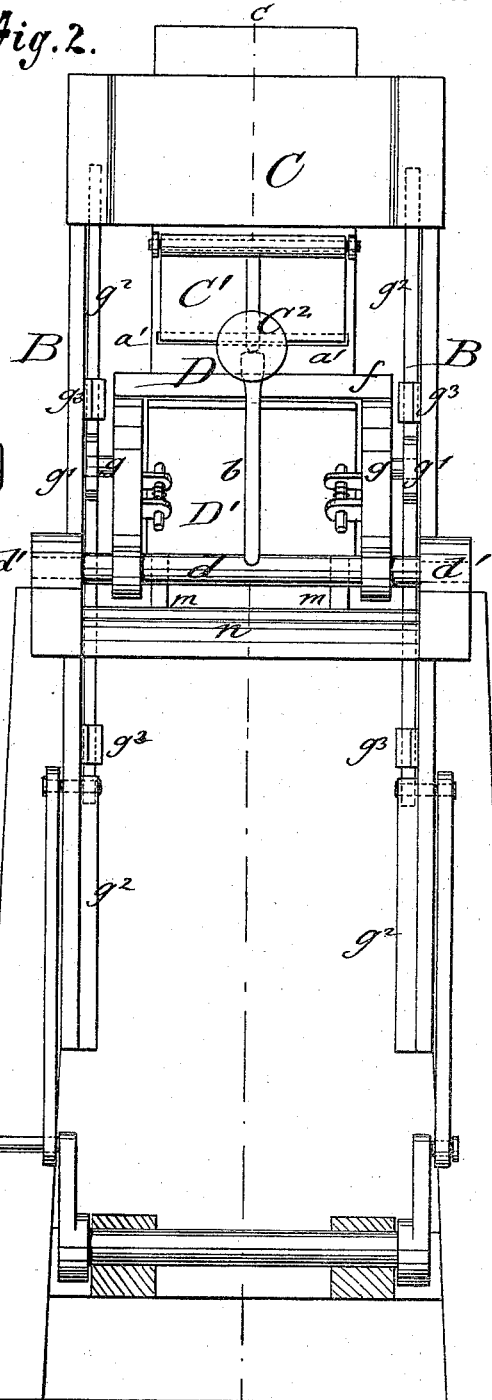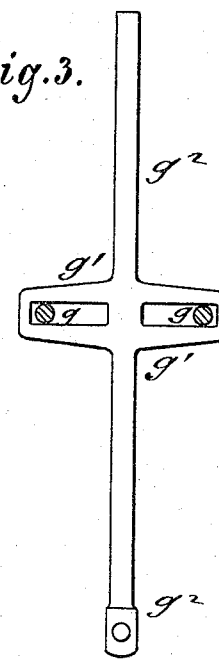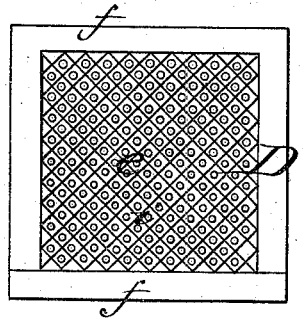
H. SCHNITZSPAN.
Machines for Cutting Cube Sugar.
No. 148,145. Patented March 3, 1874.

UNITED STATES PATENT OFFICE.

HENRY SCHNITZSPAN, OF BROOKLYN, NEW YORK, ASSIGNOR TO CARSTEN SIERCK, OF HOBOKEN, NEW JERSEY.

IMPROVEMENT IN MACHINES FOR CUTTING CUBE SUGAR.

Specification forming part of Letters Patent No. 148,145, dated March 3, 1874; application filed January 17, 1874.

*To all whom it may concern:*

Be it known that I, HENRY SCHNITZSPAN, of Brooklyn, in the county of Kings and State of New York, have invented a new and Improved Machine for Cutting Cube Sugar, of which the following is a specification:

In the accompanying drawing, Figure 1 represents a vertical central section of my improved machine for cutting sugar into cubical blocks on the line $c\ c$, Fig. 2; Fig. 2, an end elevation of the same; Fig. 3, a detail side view of the cutter-guides, and Fig. 4 a detail top view of the diagonally-arranged cutter blades.

Similar letters of reference indicate corresponding parts.

The object of my invention is to produce a machine for cutting the disks of sugar into cubes or blocks after the cutting of the loaf or cone into disks has been completed, so that this operation may be performed with greater dispatch, and neat and perfect cubes be produced, with less power than heretofore. My invention consists, mainly, of a disk-feeding apparatus, in connection with sector-shaped cutters, with diagonally-arranged curved blades, to which the disks are consecutively fed, and then cut by the downward motion caused by sliding guide-pieces connected with the driving-shaft. The blocks are dropped during the downward motion of the cutters, and, in case any should be retained, forced out by an arc-shaped spring-plate, with clearing-pins applied back of the cutter-knives.

In the drawing, A represents the supporting-frame of the cutting-machine, made of suitable size and strength. Upright standards B support, at their top parts, the laterally-arranged disk-feeding device C, which consists of a flat channel or tube of the width and thickness of the largest disks used. The disks are conveyed, in suitable manner, to the feeder C from the apparatus which cuts them from the loaves or cones, and then to the sector-shaped cutters D, arranged below the same. A gate, $C^1$, is pivoted to the side of the feeder C, and provided with a curved weighted arm, $C^2$, which causes the lower flanged end $a$ of gate C to enter slot $a'$ of the feeding-tube, and retain thereby the disks in the same until an arm, $b$, of the cutter-shaft $d$ strikes the weighted arm $C^2$, and lifts the same, opening the gate, and allowing the forward feeding of the disks to the cutters. The sector-shaped cutters D are keyed fast to shafts $d$, pivoted to bearings $d'$ of main frame A, and placed symmetrically, facing each other, below the feeder, their cutter-knives or edges $e$ being arranged in the arc of the sector, and firmly affixed in diagonal direction by the binding-frames $f$. Rotary reciprocating motion is imparted to the cutters D by means of side-projecting pins $g$, which are engaged by the slotted guide-piece $g^1$, provided with extension-rails $g^2$, Fig. 3, which slide, in keepers $g^3$, vertically along the standards B, the lower rail $g^2$ being connected, by a crank-rod, to a crank of the driving-shaft.

The disks are conveyed to the cutters when the same are in the uppermost position, in which arm $b$ opens the gate $C^1$. The disks rest on the slightly forward-projecting bottom rails of the knife-frames $f$, and are, by the downward motion of the cutters, gradually taken up by the diagonal edges in such a manner that the lower corners of each quadrangular section enter the disks before the upper, producing thereby a gradual cutting and breaking off of the blocks, without clogging or otherwise hampering the action of the cutting-edges. The progressive cutting of the blocks, on the approach of the various tiers of the edge sections, gives play to the uncut part of the disk, and facilitates greatly the neat and regular production of the cubes. The cubes drop immediately from between the knife-sections, after cutting, by the separating of the cutter-jaws; but I apply, for the purpose of securing more completely their detaching, arc-shaped plates D', with as many projecting clearing-pins $i$, which plates are guided back of the cutting-edges by rods $l$ in lugs or staples $l'$. Spiral springs $o$ are placed between lugs $l'$ on rods $l$, and act on cross-pins $o'$, which define the rear motion of the plates D'. The forward motion of the plates D is produced by the contact of the rear ends of rods $l$ with curved lugs $m$ attached to a lateral bar, $n$, at the moment when the downward motion of the cutter-jaws is completed. The clearing-pins $i$ are thereby thrust centrally through the cutter-sections, and throw out any of the cubes retained between the same. The upward motion of the cutters releases rods $l$, and carries the plates back by spiral springs $o$, leaving the cutters free for action on the following disks, and performing, in this manner, the work with great efficiency and rapidity.

Having thus described my invention, I claim as new and desire to secure by Letters Patent—

1. The sector-shaped cutter-jaws D, facing each other, and having arc-shaped diagonal-cutting knives or edges fixed firmly into binding-frames, as set forth.

2. The knife-frames of the cutters, provided with forward-projecting bottom rails for supporting thereon the disks when dropped from the feeder at the instant before the cutting operation begins, as specified.

3. The combination of the sector-shaped cutter-jaws, which are provided with projecting pins at the sides, with the slotted guide-pieces, and sliding rails connected to the driving-shaft, for imparting reciprocating rotary motion, for the purpose set forth.

4. The combination of the cutter-jaws with the rear spring-plates, having projecting clearing-pins, and the contact-lugs, for securing the throwing out of the cubes from the cutter-sections, substantially as described.

5. The sector-shaped cutter-jaws, whose pivoted shafts are provided with upward-curved arms, in combination with weighted arms of the feeding device, for producing the conveying of the disks to the cutters, substantially in the manner and for the purpose described.

HENRY SCHNITZSPAN.

Witnesses:
  T. B. MOSHER,
  ALEX. F. ROBERTS.